United States Patent [19]
Ohtagaki et al.

[11] Patent Number: 5,314,378
[45] Date of Patent: May 24, 1994

[54] REAR DIFFERENTIAL GEAR LOCK CONTROLLER WITH AUTOMATIC UNLOCK CONTROL MEANS

[75] Inventors: Shigeki Ohtagaki; Hirosi Watanabe, both of Hyogo, Japan

[73] Assignee: Mitsubishi Denki Kabushiki Kaisha, Tokyo, Japan

[21] Appl. No.: 936,004

[22] Filed: Aug. 27, 1992

[30] Foreign Application Priority Data

Aug. 27, 1991 [JP] Japan .................. 3-215001

[51] Int. Cl.⁵ ............. B60K 23/04; F16H 37/08
[52] U.S. Cl. .................. 475/150; 364/424.1
[58] Field of Search ............ 475/84, 153, 158, 254, 475/150; 74/DIG. 7, 843, 856; 364/424.01, 424.1, 426.01

[56] References Cited

U.S. PATENT DOCUMENTS

| | | | |
|---|---|---|---|
| 3,871,249 | 3/1975 | Jeffers | 475/150 X |
| 4,218,938 | 8/1980 | Hattori | 475/150 X |
| 4,671,373 | 6/1987 | Sigl | 475/150 X |
| 4,984,649 | 1/1991 | Leiber et al. | 364/424.1 X |
| 5,075,854 | 12/1991 | Imaseki et al. | 364/424.01 X |

FOREIGN PATENT DOCUMENTS

| | | | |
|---|---|---|---|
| 63-154323 | 10/1988 | Japan . | |
| 1362673 | 12/1987 | U.S.S.R. | 475/84 |
| 1534227 | 11/1987 | United Kingdom | 475/150 |

Primary Examiner—Leslie A. Braun
Assistant Examiner—Khoi Ta
Attorney, Agent, or Firm—Sughrue, Mion, Zinn, Macpeak & Seas

[57] ABSTRACT

A rear differential gear allows to be locked by a differential gear lock switch at speeds less than a first set vehicle speed, prohibited from being locked at speeds greater than or equal to the first set vehicle speed, and automatically unlocked if the locked state elapses a predetermined period of time at speeds greater than or equal to a second set vehicle speed that is greater than the first set vehicle speed. Therefore, it can prevent reduction in driving stability due to the under-steering in a turning, even if a driver has forgotten unlocking the locked rear differential gear by operating the differential gear lock switch in a rear differential lock controller.

3 Claims, 2 Drawing Sheets

REAR DIFFERENTIAL GEAR LOCK CONTROLLER WITH AUTOMATIC UNLOCK CONTROL MEANS

BACKGROUND OF THE INVENTION

The invention relates to a rear differential gear lock controller of a vehicle.

A rear differential gear lock controller which allows a rear differential gear to be locked by a differential gear lock switch at speeds less than a set vehicle speed and prohibits the rear differential gear from being locked at speeds greater than or equal to the set vehicle speed is known. Once the rear differential gear has been locked, the rear differential gear remains locked unless the driver unlocks the rear differential gear by the operation of the differential gear lock switch.

As described above, the conventional rear differential gear lock controller leaves the rear differential locked if the rear differential gear has once been locked and if the driver has forgotten to unlock it by the differential gear lock switch thereafter. If the vehicle continues running with the rear differential gear locked, under-steering occurs when making a turn, thus imposing the problem of reducing the driving stability.

SUMMARY OF THE INVENTION

The invention has been made to overcome the above-mentioned problem. Accordingly, the object of the invention is to provide a rear differential gear lock controller capable of not only providing high stability but also automatically unlocking the rear differential gear.

The invention is applied to a rear differential gear lock controller which includes an automatic unlock condition judging unit and a control unit. The automatic unlock condition judging unit judges that an automatic unlock condition has been established when a locked state of the rear differential gear elapses a predetermined period of time at a speed greater than a second set vehicle speed that is greater than a first set vehicle speed. The control unit allows the rear differential gear to be locked by the operation of a differential gear lock switch at speeds less than the first set vehicle speed, prohibits the rear differential gear from being locked at speeds greater than or equal to the first set vehicle speed, and automatically unlocks the locked rear differential gear when the automatic unlock condition has been established.

The invention allows the rear differential to be locked by the differential gear lock switch at speeds less than the first set vehicle speed and prohibits it from being locked at speeds greater than or equal to the first set vehicle speed and automatically unlocks the rear differential gear without operating the differential gear lock switch when the automatic unlock condition has been established.

DESCRIPTION OF THE PREFERRED EMBODIMENT

Figure 1:
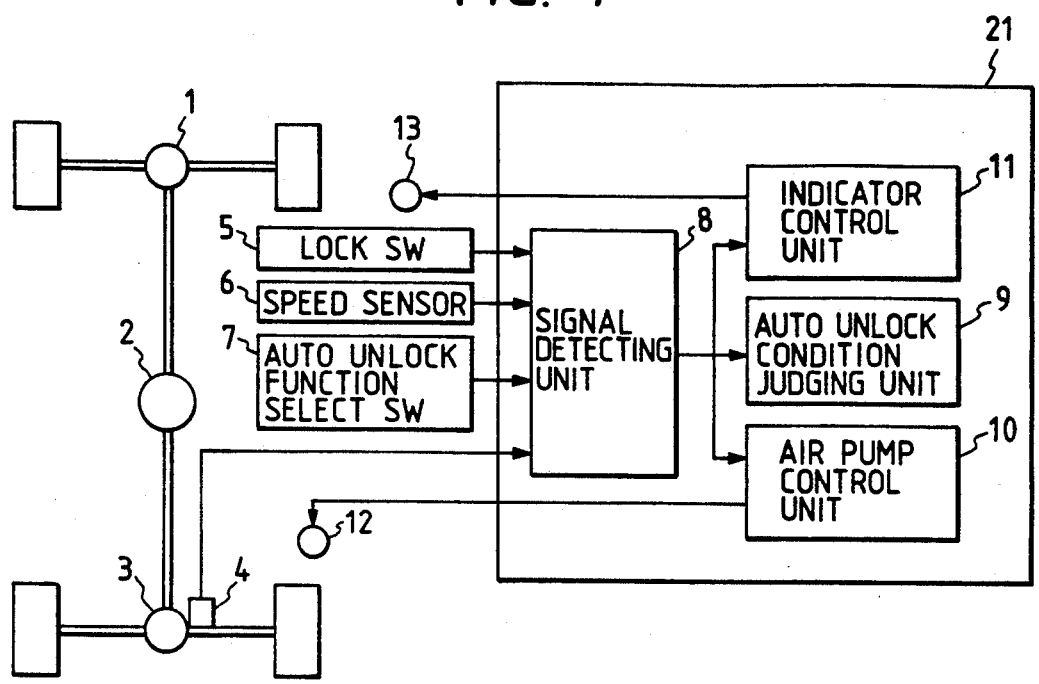
FIG. 1 is a diagram showing a configuration of an apparatus of the invention.

An embodiment of the invention will hereunder be described with reference to the drawings. FIG. 1 shows a configuration of a rear differential lock controller, which is the embodiment of the invention. Reference numeral 1 designates a front differential gear; 2, a center differential gear; 3, a rear differential gear; 4, a lock detecting switch for detecting the locked state of the rear differential gear 3; 5, a differential gear lock switch for issuing an instruction for locking the rear differential gear 3; 6, a speed sensor for detecting a vehicle speed; 7, an automatic unlock function selector switch that selects the function for automatically unlocking the rear differential gear; 12, an air pump that produces air pressure for driving a mechanism for locking the rear differential 3; and 13, an indicator that indicates the locked state of the rear differential 3.

Figure 2:
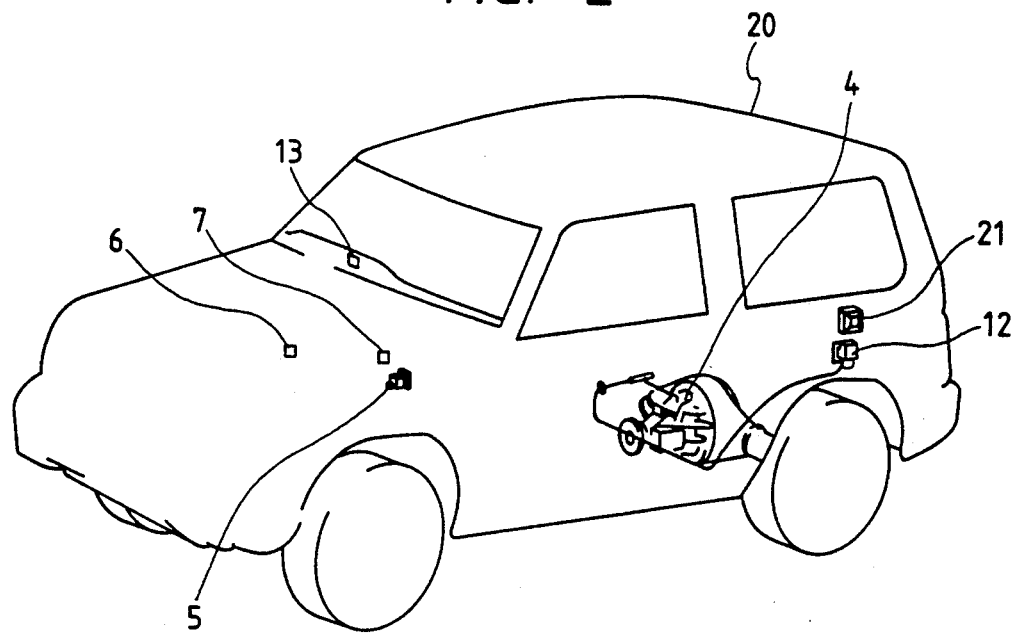
FIG. 2 is a perspective view showing a vehicle body mounting the apparatus of the invention thereon.

Reference numeral 8 designates a signal detecting unit that receives outputs of the lock detecting switch 4, the differential gear lock switch 5, the speed sensor 6, and the automatic unlock function selector switch 7; 9, an automatic unlock condition judging unit for judging an automatic unlock condition for the locked rear differential gear 3 based on an output of the signal detecting unit 8; 10, an air pump control unit for controlling the air pump 12 based on outputs of the signal detecting unit 8 and the automatic unlock condition judging unit 9; and 11, an indicator control unit for controlling the indicator 13 based on the output of the signal detecting unit 8. The components designated by reference numerals 8 to 11 constitute a control section 21. FIG. 2 is a perspective view of a vehicle body 20 on which the respective components shown in FIG. 1 are mounted.

Figure 3:
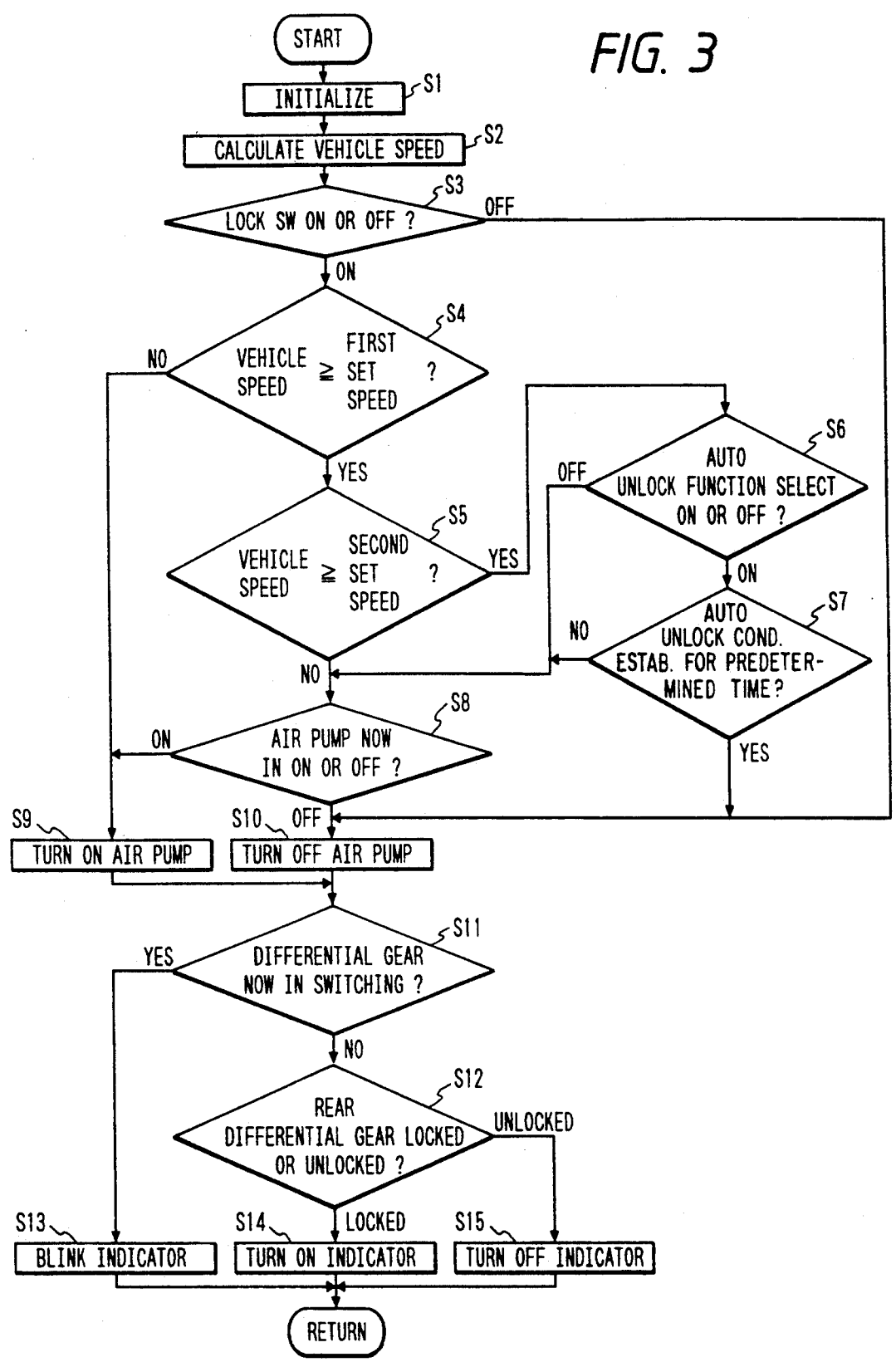
FIG. 3 is a flowchart showing an operation of the apparatus of the invention.

An operation of the control section 21 will be described with reference to a flowchart shown in FIG. 3. The values of the control section 21 are initialized in Step S1 upon start, and the vehicle speed is calculated based on an output of the speed sensor 6 in Step S2. In Steps S3 to S10 the air pump 12 is controlled. In Step S3, it is judged whether or not the differential gear lock switch 5 is turned on or off. If the differential gear lock switch 5 is turned off, then the processing proceeds to Step S10 to turn off the air pump 12, oil pump or electric motor. If differential gear lock switch 5 is turned on, then the processing proceeds to Step S4 to judge whether or not the vehicle speed is greater than or equal to the first set vehicle speed, or is less than the first set vehicle speed. If the vehicle speed is less than the first set vehicle speed, the air pump 12 is turned on and the rear differential gear lock mechanism is driven to lock the rear differential gear 3 in Step S9.

If the speed of the vehicle is greater than or equal to the first set vehicle speed, then the processing proceeds to Step S5, in which it is judged whether or not the vehicle speed is greater than or equal to the second set vehicle speed that is greater than the first set vehicle speed. If the speed is greater than or equal to the second vehicle speed, the processing proceeds to Step S6, whereas if the speed is less than the second set vehicle speed, then the processing proceeds to Step S8. In Step S6, it is judged whether the automatic unlock function selector switch 7 is turned on or off. If the switch 7 is turned on, the processing proceeds to Step S7, whereas if the switch 7 is turned off, the processing proceeds to Step S8.

In Step S7, it is judged whether or not the automatic unlocking condition has been established; i.e., it is judged that the automatic unlock condition has been established if the vehicle speed continues to be greater than the second vehicle speed for a predetermined period of time or more with the rear differential gear 3 being locked. In Step S10, the air pump 12 is turned off, unlocking the rear differential gear 3. In cases other than the above, it is judged that the automatic unlock condition has not been established, and the processing proceeds to Step S8. In Step S8, it is judged that the air pump 12 is now in turning on or off. If the air pump 12 is turning on, then the air pump 12 is kept turned on in Step S9, whereas if the air pump 12 is turned off, the air pump 12 is kept turned off in Step S10.

The operation of controlling the indicator 13 is performed in Steps S11 to S15. In Step S11, it is judged that the rear differential gear 3 is in the course of switching between the locked state and the unlocked state on the basis of the outputs of the lock detecting switch 4 and the differential gear lock switch 5. If the locked state is in the course of being switched, the indicator 13 is caused to blink in Step S13, whereas if not, the processing proceeds to Step S12. In Step S12, it is judged that the rear differential gear 3 is locked or unlocked. If the rear differential 3 is locked, the indicator 13 is turned on in Step S14, whereas if the rear differential 3 is unlocked, the indicator 13 is turned off in Step S15. The control operation returns to the start after Steps S13 to S15.

While the mechanism for locking the rear differential gear 3 is driven air-hydraulically in the above embodiment, the mechanism may be driven oil-hydraulically using a hydraulic pump or electrically using a motor.

As described in the foregoing, the invention allows the locked rear differential gear to be unlocked automatically under a predetermined condition. Thus, even if the driver forgets unlocking the locked rear differential gear by operating the differential gear lock switch, deterioration of the driving stability due to the understeering during the turning can be prevented.

What is claimed is:

1. A rear differential gear lock controller comprising:
   driving means for driving a mechanism for locking a rear differential gear of a vehicle;
   first instruction means for issuing an instruction for locking and unlocking said rear differential gear;
   second instruction means for issuing an instruction for automatically unlocking said rear differential gear;
   a speed sensor for detecting a speed of said vehicle;
   detecting means for detecting a locked state of said rear differential gear;
   automatic unlock condition judging means for judging that an automatic unlock condition, based on said second instruction means, has been established and including means for judging that said locked state of said rear differential gear has been detected for a predetermined time at a vehicle speed greater than or equal to a second set vehicle speed, said second set vehicle speed being greater than a first set vehicle speed; and
   a control means for allowing said rear differential gear to be locked by an operation of said instruction means whenever the vehicle speed is less than said first set vehicle speed, for prohibiting said rear differential gear from locking at a speed greater than or equal to said first set vehicle speed, and for automatically unlocking said locked state without said operation of said instruction means when said automatic unlock condition has been established.

2. A rear differential gear lock controller as claimed in claim 1, further comprising an indicator and indicator controlling means, wherein said indicator is blinked on when said rear differential gear is in a course of switching between a locked state and an unlocked state.

3. A rear differential gear lock controller as claimed in claim 1, wherein said driving means is selected from one of a air-hydraulically pump, an oil-hydraulically pump and an electrical motor.

* * * * *